(12) United States Patent
Rendel et al.

(10) Patent No.: US 11,241,989 B2
(45) Date of Patent: Feb. 8, 2022

(54) CONFIGURATION OF A MASSAGE PROGRAM FOR A MASSAGE DEVICE OF A VEHICLE SEAT

(71) Applicant: VOLKSWAGEN AKTIENGESELLSCHAFT, Wolfsburg (DE)

(72) Inventors: Holger Rendel, Braunschweig (DE); Matthias Meitzner, Wendeburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 23 days.

(21) Appl. No.: 16/707,699

(22) Filed: Dec. 9, 2019

(65) Prior Publication Data

US 2020/0108759 A1    Apr. 9, 2020

Related U.S. Application Data

(63) Continuation of application No. PCT/EP2018/065109, filed on Jun. 8, 2018.

(30) Foreign Application Priority Data

Jun. 8, 2017 (DE) ..................... 10 2017 209 705.1

(51) Int. Cl.
  *B60N 2/90* (2018.01)
(52) U.S. Cl.
  CPC .................................. *B60N 2/976* (2018.02)
(58) Field of Classification Search
  CPC ............................. B60N 2/976; B60N 2/0244
  See application file for complete search history.

(56) References Cited

U.S. PATENT DOCUMENTS 8,616,654 B2   12/2013   Zenk et al.
8,678,500 B2   3/2014   Lem et al.
(Continued)

FOREIGN PATENT DOCUMENTS

CN    105555599 A    5/2016
CN    106102682 A    11/2016
(Continued)

OTHER PUBLICATIONS

Korean Office Action dated Jan. 19, 2021 in corresponding application 10-2019-7033685.
(Continued)

*Primary Examiner* — Sarah B McPartlin
(74) *Attorney, Agent, or Firm* — Muncy, Geissler, Olds & Lowe, P.C.

(57) ABSTRACT

A method for configuring a massage program of a massage device of a vehicle seat by an electronic control unit, which is connected indirectly or directly to at least one control unit for the vehicle seat of the vehicle. When configuring the created massage program, at least one element of the vehicle seat, to which element pressure can be applied, is controlled by means of the electronic control unit, wherein the vehicle seat control unit outputs the massage program after the start of the massage program in accordance with the configuration performed by controlling the individual elements, to which pressure can be applied, in the vehicle seat. It is provided that, within the configuration for creating the massage program, at least one configuration step is performed by the electronic control unit and at least one configuration step is performed directly at the seat part and/or at the backrest part.

14 Claims, 3 Drawing Sheets

(56) References Cited

U.S. PATENT DOCUMENTS

| | | | |
|---|---|---|---|
| 9,744,887 B2 | 8/2017 | Durt et al. | |
| 9,925,894 B2 * | 3/2018 | Lem | B60N 2/0244 |
| 10,300,823 B2 | 5/2019 | Lem et al. | |
| 10,369,074 B2 | 8/2019 | Oberg et al. | |
| 10,647,237 B2 * | 5/2020 | Song | B60W 10/30 |
| 2008/0188782 A1 * | 8/2008 | Carkner | A61H 9/0078 |
| | | | 601/151 |
| 2015/0277754 A1 | 10/2015 | Misch et al. | |
| 2019/0299831 A1 * | 10/2019 | Rosero | A61H 9/0078 |

FOREIGN PATENT DOCUMENTS

| | | |
|---|---|---|
| DE | 10 2007 053 119 A1 | 5/2009 |
| DE | 10 2012 201 331 A1 | 9/2012 |
| DE | 10 2012 212 834 A1 | 1/2014 |
| DE | 10 2013 012 768 A1 | 3/2014 |
| DE | 10 2014 205 574 A1 | 10/2015 |
| DE | 10 2014 216 161 A1 | 2/2016 |
| DE | 10 2016 003 573 A1 | 8/2016 |
| DE | 10 2015 218 051 A1 | 3/2017 |
| ER | 0 778 173 A2 | 6/1997 |
| JP | 2009534061 A | 9/2009 |
| KR | 20140068755 A | 6/2014 |

OTHER PUBLICATIONS

Chinese Office Action dated Jun. 22, 2021 in corresponding application 201880037877.4.

\* cited by examiner

CONFIGURATION OF A MASSAGE PROGRAM FOR A MASSAGE DEVICE OF A VEHICLE SEAT

This nonprovisional application is a continuation of International Application No. PCT/EP2018/065109, which was filed on Jun. 8, 2018, and which claims priority to German Patent Application No. 10 2017 209 705.1, which was filed in Germany on Jun. 8, 2017, and which are both herein incorporated by reference.

BACKGROUND OF THE INVENTION

Field of the Invention

The present invention relates to a method and a system for configuring a massage program of a massage device of a vehicle seat of a vehicle by means of an electronic control unit.

Description of the Background Art

The document DE 10 2013 012 768 A1 describes a method for adjusting a massage function through an electronic control unit, wherein the massage is defined exclusively on the mobile electronic control unit.

The document DE 10 2006 003 573 A1 describes a massage function through separate contact areas in a vehicle seat, each of which can be activated or not activated.

The documents DE 10 2012 212 834 A1 (which corresponds to U.S. Pat. No. 10,300,823) and DE 10 2014 205 574 A1 (which corresponds to US 2015/0277754) describe a massage function with block-by-block definition of massage sections.

In addition, the document DE 10 2007 053 119 A1, which corresponds to U.S. Pat. No. 8,616,654, discloses the use of pressure sensors in the vehicle seat for detecting the load on pressure cushions for a position associated with a person.

Finally, the document DE 10 2015 218 051 is also known, which describes a method for controlling an electromechanical lumbar adjustment. Two operating principles of massage functions in vehicle seats are explained: In a first operating principle, cushions installed in the vehicle seat are hydraulically or pneumatically filled to a greater or lesser extent, which results in a more or less pronounced curvature and application of pressure to the part of the body resting against the same. In a second operating principle, a rigid component is moved at right angles to the contact surface, causing a pressure to be exerted on the passenger by the means that a point pressure is first exerted on a plastic plate, then is distributed and transmitted to the passenger as a function of the design of the plate. Described in detail with regard to the electromechanical lumbar adjustment is that user entries are captured that include an entered motion sequence in one, two, or three spatial directions. Control signals for controlling the electromechanical lumbar adjustment are generated on the basis of the user entries through a data entry unit, in particular a mobile user device, and the control signals are stored. Finally, a motion of the electromechanical lumbar adjustment, in particular of the lumbar plate, is executed based on the control signals. The motion of the lumbar plate of the electromechanical lumbar adjustment takes place along the entered motion sequence or along a trajectory determined on the basis of this motion sequence. The associated system includes a data entry unit, a control unit, and a memory unit, as well as an external memory unit. The system is coupled through an interface to the electromechanical lumbar adjustment, which in advantageous manner is likewise designed as a massage device.

SUMMARY OF THE INVENTION

It is therefore an object of the present invention to provide a method and a system for configuring a massage program for a massage device of a vehicle seat of a vehicle by means of an electronic control unit that allows for the user a simple and intuitive configuration, in the sense of convenient operating actions that meets their needs.

In an exemplary embodiment of the invention, provided is a method for configuring a massage program of a massage device of a vehicle seat of a vehicle via an electronic control unit, which communicates indirectly or directly with at least one controller of the vehicle seat of the vehicle, wherein at least one pressurizable element of the vehicle seat is controlled via the electronic control unit during the configuration of the created massage program, and, after the start of the massage program, the controller of the vehicle seat outputs the massage program by controlling the individual pressurizable elements in the vehicle seat in accordance with the configuration performed.

Within the configuration for creating the massage program, at least one configuration step can be performed via the electronic control unit and at least one configuration step is performed directly at the seat portion and/or at the backrest portion. A significant advantage is that at least one configuration step is performed through an operating action directly at the at least one pressurizable element of the vehicle seat, which makes possible intuitive operation by a user. Moreover, another important advantage is that the user not only sets a final pressure of the at least one pressurizable element during the configuration by means of his operating action, but also can configure a pressure pattern for the at least one pressurizable element that is reproduced by means of the massage device during the massage later performed. An important advantageous aspect thus includes in performing configuration steps on an electronic control unit that are coupled to real configuration steps to be performed on the vehicle seat.

The at least one configuration step that can be performed on the one hand can be performed on a mobile electronic control unit and/or on a control unit that may be permanently located in the vehicle.

The massage program can be created in the mobile electronic control unit by means of an application program and is transmitted wirelessly or over wires by means of a transmitting and receiving unit through an access point to a transmitting and receiving unit of the vehicle, and in the vehicle is routed through a vehicle-internal communication line to the controller of the vehicle seat of the vehicle. The transmitting and receiving unit can also be arranged directly in the controller of the vehicle seat so that the vehicle-internal communication line is not required. In this example, a mobile electronic control unit with a specific application program is advantageously available to the user, which he can use flexibly in a mobile manner outside and inside the vehicle.

The massage program can be created in an electronic control unit that is permanently located in the vehicle by means of an application program and is transmitted wirelessly or over wires by means of a transmitting and receiving unit through an access point to a transmitting and receiving unit of the vehicle, and in the vehicle is routed through a vehicle-internal communication line to the controller of the vehicle seat of the vehicle. The transmitting and receiving unit can also be arranged directly in the controller of the vehicle seat so that the vehicle-internal communication line is not required. In the case of wired communication between the electronic control unit and the controller of the vehicle seat, the transmitting and receiving units required for wireless communication can be omitted. Here, an electronic control unit is made available to the user that is permanently installed in the vehicle so that an electronic control unit that is already present in the vehicle can advantageously also be used for the configuring.

Provision is made in an example that the created massage program is not only created in the mobile or permanent electronic control unit by means of the application program and transmitted wirelessly or over wires to the controller of the vehicle seat of the vehicle, but also that the created massage program is stored in the controller of the vehicle seat so that the massage program can be executed even without the application program.

The at least one configuration step performed by means of the electronic control unit can be an operating action at a user interface of the electronic control unit in which at least one time slice is defined within which at least one recording of at least one pressurizable element of the vehicle seat is started by another operating action at the user interface of the electronic control unit in which, after the start of the at least one recording in the at least one configuration step performed directly at the seat portion and/or at the backrest portion, an operating action is performed directly on at least one of the pressurizable elements in which the at least one pressurizable element is pressurized, until the recording is ended, with a specifiable pressure that depends on the operating action for a time period that depends on the duration of the operating action. The above described features illustrate the combination of configuration steps in the form of operating actions at the electronic control unit and directly at the vehicle seat, which is discussed in detail later in the description.

Multiple recordings of the at least one pressurizable element can be recorded in a time slice. As a result of this procedure, the possibility advantageously exists of repeating an operating action so that multiple pressure patterns can be recorded for a single pressurizable element, which in turn can be combined into an overall pressure pattern, as is likewise explained in detail in the description.

Furthermore, at least one or multiple recordings can be recorded individually or simultaneously of one or more pressurizable elements in a time slice. As a result of this procedure, the variability of the configuration of the massage device is increased still further, since multiple pressurizable elements can also be addressed/configured by the user in an intuitive manner through operating actions performed directly at the vehicle. This is likewise discussed in detail later in the description. As a result of this procedure, it is also possible in advantageous fashion to configure so-called patterns, for example.

This means that it is possible by configuring multiple elements to represent massage patterns in the seat portion and/or in the backrest portion, which—as already explained—can be carried out by real operating actions performed at the vehicle seat, wherein an operating action can also take place in parallel at multiple elements at the same time.

Multiple time slices can be recorded, wherein one or more time slices with one or more recordings apiece can be executed consecutively after the massage program is started following completion of the configuration, wherein the time slices are configured in the configuration sequence or in a freely selectable sequence, or only some of the configured time slices are configured in their configuration sequence or freely selected sequence, and are executed as a function of the configuration in the massage program that is started following the end of the configuration.

If multiple time slices are configured, then another major advantage is that, as described above, the time slices can accordingly be variably adapted after the fact with regard to their sequence or with regard to the selection of time slice, so that different massage programs can be created through these changes alone without the need for recordings to be recorded again at the pressurizable elements.

The recording within a time slice that has the maximum time period detected in a timekeeping component of the electronic control unit can be defined and output within the massage program as the duration of the relevant time slice. The advantage of this method feature is in that the maximum duration of the time slice to be configured is automatically analyzed by the correspondingly applied program and defined and stored as the duration of the time slice, so that a time slice duration is produced in the subsequent massage program that does not have to be separately adjusted by the user.

The pressure pattern characteristic curves that have been recorded in multiple recorded recordings of one and the same pressurized element in a time slice can be superimposed after their recording, wherein the recording within a time slice with the maximum time period in the timekeeping component of the electronic control unit determines the maximum duration of the multiple recorded recordings, wherein the maximum measured pressures in the multiple recorded recordings are combined into a common overall characteristic curve of the pressure pattern at each point in time in this maximum time period. This procedure is likewise particularly advantageous, since it is left entirely up to the user to configure one and the same element in different recordings, wherein the applied program detects a repeated configuration of one and the same element within a time slice, and creates a single characteristic curve that is then automatically processed accordingly into an overall characteristic curve, as is likewise discussed in detail later in the description.

The method can be carried out with a configuration system for configuring a massage program for a massage device of a vehicle seat of a vehicle that includes the following components.

At least one electronic control unit, which communicates indirectly or directly with at least one controller of the vehicle seat of the vehicle, is also provided.

At least one pressurizable element in a vehicle seat, which is connected by at least one actuator to the controller of the vehicle seat of the vehicle, is also provided.

Associated with each pressurizable element of the vehicle seat, therefore, may be an actuator, which is connected to the at least one controller of the vehicle seat of the vehicle, which fills or empties the at least one pressurizable element with a fluid medium by means of the actuator.

Associated with each pressurizable element may be a pressure sensor, which is connected to the at least one controller of the vehicle seat of the vehicle and which senses a pressure over time in the at least one pressurizable element in order to sense pressure patterns. Because the controller on the vehicle seat side communicates reciprocally with the electronic control unit, these data are also present in the electronic control unit.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
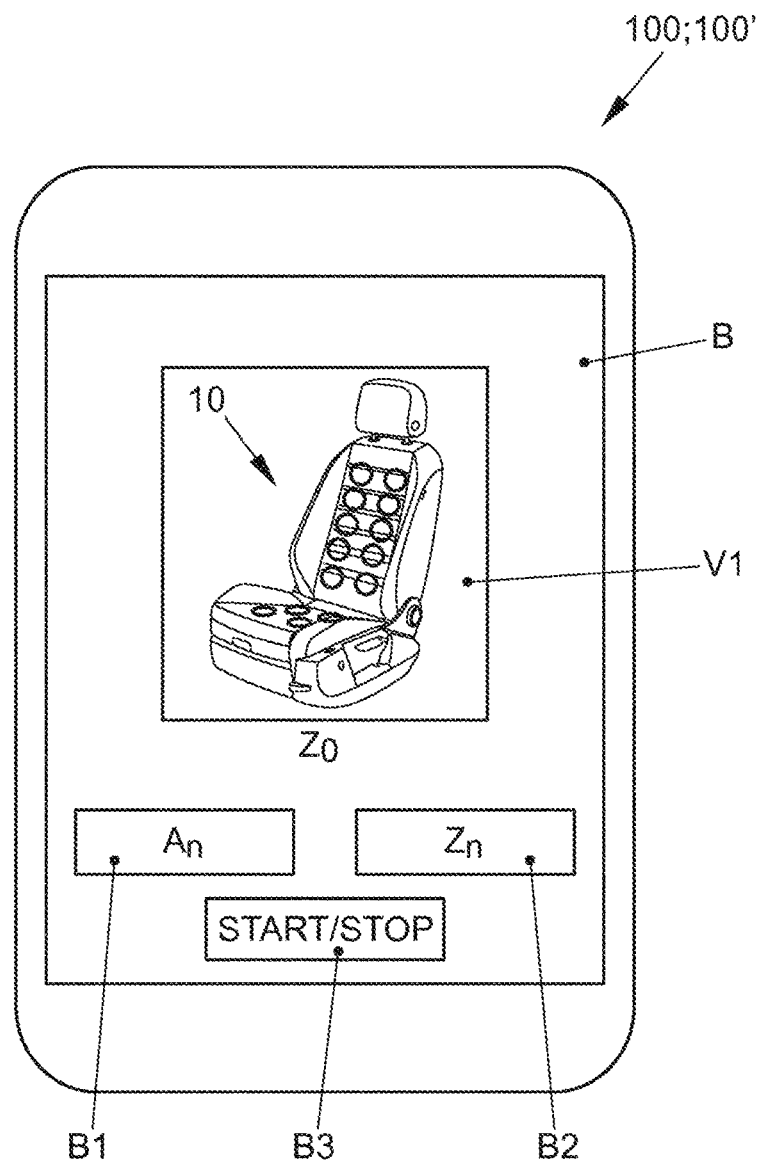
FIG. 1 shows a user interface of an electronic control unit.

FIG. 1 shows by way of example an electronic control unit 100, 100' with an operator interface/user interface B, in particular a touch screen, through which user entries to a massage device of the vehicle are entered.

The representation in FIG. 1 is, for example, a mobile (can be used outside and inside the vehicle seat) electronic control unit 100.

An electronic control unit 100' that is permanently installed in the vehicle, which in particular likewise has a touch screen and is located, for example, on a center console of the vehicle or in a position associated with a seating space, can also be used for user input.

The permanent electronic control unit 100' is connected wirelessly, preferably in a wired manner, to a controller (not shown) of the vehicle seat 10 of a vehicle. The electronic control unit 100' and the controller that is not shown in detail exchange data with one another in both directions.

The mobile electronic control unit 100 can be a cell phone, a tablet computer, or a notebook, for example. The mobile electronic control unit 100 includes a transmitting and receiving unit. The transmitting and receiving unit 100 of the mobile electronic control unit 100 is connected wirelessly, at least at times, through a radio link to a transmitting and receiving unit of the controller of the vehicle seat 10. The mobile electronic control unit 100 can also exchange data with the controller of the vehicle seat 10 in a wired manner so that transmitting and receiving units are not required. The mobile electronic control unit 100 and the controller that is not shown in detail of the vehicle seat 10 preferably exchange data wirelessly with one another in both directions.

In summary, data can be exchanged indirectly or directly, in a wireless and/or wired manner, between the electronic control unit 100, 100' that is mobile or permanently located in the vehicle and the controller of the massage device of the vehicle 10.

Provision is made in accordance with the invention that the relevant control unit 100, 100' has a graphical user interface B, which displays control elements B1, B2, B3 in the functionally required quantity in one or more levels so that user input can be entered with the help of the graphical user interface B. As a result, the user inputs can advantageously be entered especially easily and quickly.

For example, operation can take place by means of a graphical user interface B on the touch screen of a cell phone, as is illustrated in FIG. 1.

It is a matter of course that gesture control may also be used for entering user inputs, both at the mobile electronic control unit 100 and at the permanent electronic control unit 100'.

In the exemplary embodiment, a visualization element V1 depicting a vehicle seat 10, which includes a seat portion 12 and a backrest portion 14, is located on the user interface B.

The user interface B includes a control element B1 for a user input with the title "Recording" $A_n$ (n=number of recordings) and a control element B2 for a user input with the title "New Time Slice" or "Next Time Slice" $Z_n$ (n=number of time slices).

The control element B1 is multifunctional, for example, and at first prompts by means of a label for a recording as "first recording" $A_{n=1}$ or "next recording" $A_{n+1}$ and so on.

When the control element B1 is pressed, the "first recording" $A_1$ or the "next recording" $A_2$ starts. The label changes after each start and prompts to "stop the relevant recording" $A_1$ or $A_2$ and so on. Then the label changes again, so that a "next recording" $A_{n+1}$ and so on is called for.

Figure 2:
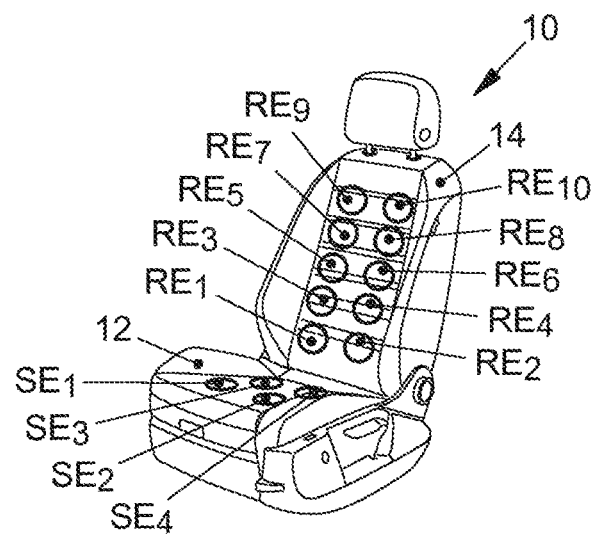
FIG. 2 shows a vehicle seat with pressurizable element.

The vehicle seat 10 represented in FIG. 2 is intended to illustrate the real vehicle seat 10 located in a vehicle, which is shown in the at least one visualization element V1 of the user interface B in FIG. 1.

The vehicle seat 10 has multiple pressurizable elements $SE_n$, $RE_n$, which are located under the surface of the seat cushion of the seat portion 12 or of the backrest cushion of the backrest portion 14, for example.

To illustrate the invention, four cushion-like pressurizable elements $SE_n$ (n=1 to 4) are shown in the seat portion 12, and ten cushion-like pressurizable elements $RE_n$ (n=1 to 10) are shown in the backrest portion 14.

For simplification, the discussion below refers to pressure cushions $SE_n$ in the seat portion 12 and pressure cushions $RE_n$ in the backrest portion 14.

It is possible to distribute a multiplicity of pressure cushions $SE_n$ in the seat portion 12 and pressure cushions $RE_n$ in the backrest portion 14.

The pressure cushions $SE_n$ and $RE_n$ are connected to the controller of the vehicle seat 10 by actuators and pressure sensors (not shown in detail) that are associated with them.

Stored in the controller of the vehicle seat 10, for example by the factory, is at least one massage program, which controls the pressure cushions $SE_n$, $RE_n$ through the actuators and pressure sensors that are not shown in detail in such a manner that the pressure cushions $SE_n$, $RE_n$—individually, in combination, or following one another in a time sequence—are filled with a medium as the pressure is increased over time, or the medium is removed again from individual the pressure cushions $SE_n$, $RE_n$ as the pressure is reduced over time.

The medium is air, for example; however, other media can also be used that are capable of influencing the pressure over time and thus the pressure pattern over time in the pressure cushions $SE_n$, $RE_n$. Such a massage program can be retrieved when a vehicle user is traveling with the motor vehicle.

If the vehicle user wishes to configure an individual massage program tailored to his specific needs, then in the configuration method according to the invention he performs certain configuration steps directly at the vehicle seat 10 and certain configuration steps at the mobile and/or fixed electronic control unit 100, 100', wherein the configuration of the configuration steps at the mobile electronic control unit 100 takes place by means of an application program called an app, as explained below.

The application program is configured specifically for massage programs, wherein the invention makes provision that configuration steps performed directly at the vehicle seat 10 are displayed in the visualization element V1, as is likewise explained below.

Provision is made that after the massage-specific application program/application software is invoked on the user interface B of the mobile and/or fixed electronic control unit 100, the vehicle seat 10 with the pressure cushions $SE_n$, $RE_n$ is displayed on the user interface B, wherein the seat portion 12 in the exemplary embodiment has the pressure cushions $SE_1$, $SE_2$, $SE_3$, $SE_4$ and the backrest portion 14 in the exemplary embodiment has the pressure cushions $RE_1$, $RE_2$, $RE_3$, $RE_4$, $RE_5$, $RE_6$, $RE_7$, $RE_8$, $RE_9$, $RE_{10}$.

Further provision is made that each pressure cushion $SE_n$, $RE_n$ is coupled to the pressure sensor that is not described in detail. The pressure sensors communicate with the electronic control unit 100, 100' through the controller of the vehicle seat 10 via the application program, and detect every pressure change in the pressure cushions $SE_n$, $SE_n$, wherein pressure sensors that are very sensitive to pressure changes are used. This means that a changing pressure can be determined correspondingly rapidly and with high accuracy. The pressure cushions $SE_n$, $RE_n$ have ambient pressure in an unfilled initial state.

Furthermore, a timekeeper $T_n$ is associated in the application program with each pressure cushion $SE_n$, $RE_n$.

By means of the timekeeper $T_n$ (n=1, 2, 3 . . . ), a pressure pattern $p_n$ in the pressure cushions $SE_n$, $RE_n$ can be detected over time $t_n$ (see FIGS. 4A, 4B, 4C, in particular) within a time period $\Delta T_n$ associated with the time slices $Z_n$.

The defined time period $\Delta T_n$ is associated with at least one time slice $Z_n$ (nth time slice), wherein equal or different time periods $\Delta T_n$ can be associated with each time slice $Z_n$, as explained below.

Provision is made according to the invention that the area of a part of the body (buttocks and/or back) of a seated person to be massaged is/are not configured on the mobile and/or fixed electronic control unit 100, 100', but instead directly at the vehicle seat 10, wherein according to the invention provision is made for all configuration steps explained below that the configuration can be edited at the mobile and/or fixed electronic control unit 100, 100'.

The configuration steps are explained by way of example below in a synopsis based on FIGS. 1 and 3A through 3D:

Configuration Step—"Select at Least One Time Slice $Z_n$":

At the user interface B of the relevant electronic control unit 100, 100', the user selects the control element B2 with the title "New Time Slice" or "Next Time Slice" $Z_n$ (n=number of time slices).

If no time slice $Z_n$ is defined yet, the time slice $Z_1$ is defined as the "New Time Slice." The first configuration step as an operating action of the user thus takes place at the relevant electronic control unit 100, 100'.

Figure 3A:
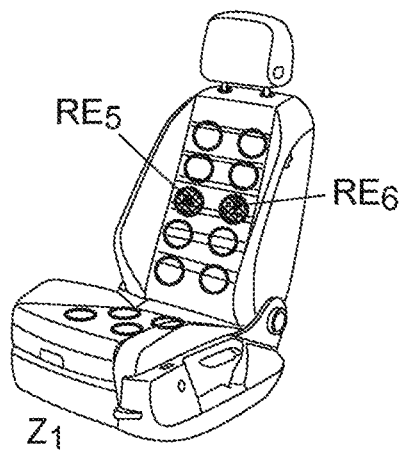
FIG. 3A shows the vehicle seat with two elements in a backrest portion of the vehicle seat that are pressurized with a maximum pressure.

Configuration Step—"Create at Least One Recording $A_n$ (n=1)":

The user actuates a region in the center of the backrest area of the backrest portion 14 in the sense of a pressure actuation on at least one of the pressure cushions $RE_n$ from the example in FIG. 3A directly at the vehicle seat 10, so that pressure is applied to the pressure cushions $RE_5$ and $RE_6$ as indicated by the crosshatching.

At the start of the operating action at the vehicle seat 10, the control element B1 at the relevant electronic control unit 100, 100' is actuated for a user input with the title "New Recording" if this is the first recording, causing a first pressure pattern $p_5/t_5$ and $p_6/t_6$ for the pressure cushions $RE_5$ and $RE_6$ to be recorded in a recording $A_1$ within the first time slice $Z_1$.

In this exemplary embodiment, the crosshatching means that the pressure actuation at the two pressure cushions $RE_5$ and $RE_6$ has taken place such that the two pressure cushions $RE_5$ and $RE_6$ have been pressurized to 100% with a maximum pressure $p_{5max}$, $p_{6max}$ within the time $t_0$ to $t_5$ and $t_0$ to $t_6$. The second configuration step with two operating actions by the user thus takes place at the vehicle seat 10 and at the relevant electronic control unit 100, 100' in combination.

In the application program, the times $t_5$ and $t_6$ are assigned at 100% to a timekeeping component $T_n$ so that it is possible to determine what time periods $\Delta T_n$ have elapsed from $t_0$ to $t_5$ and $t_0$ to $t_6$ between the start operating action at the control element B1 and the stop operating action at the control element B1.

As long as no additional recordings $A_n$ take place, the time period $\Delta T_5/\Delta T_6$ with the longest duration is detected as the maximum time period $\Delta T_{5max}/\Delta T_{6max}$ for the first time slice $Z_1$.

Essentially, a configuration of the massage program is thus already completed in two configuration steps; if no further configuration takes place, the control of the actuators of the pressure cushions $SE_A$, $RE_n$ is carried out when the massage program is started through actuation of a start/stop control element B3 implemented as a control area of the touch screen of the electronic control unit 100, 100', so that the desired massage function takes place according to the above-described configuration, and therefore the pressure cushions $RE_5$ and $RE_6$ are pneumatically or hydraulically filled with a fluid medium to 100% with a predefinable pressure and emptied again during the first time slice $Z_1$ in accordance with the stored first pressure pattern $p_5/t_5$ and $p_6/t_6$ for the pressure cushions $RE_5$ and $RE_6$.

By again actuating the start/stop control element B3 implemented as a control area on the touch screen at any time after the start of the massage program, the program can be stopped before the termination automatically provided in the configuration.

Configuration Step (Optional)—"Create Multiple Recordings $A_n$ (n>1)":

According to the invention, multiple recordings $A_n$ (n>1) can be entered in each time slice $Z_n$ and are correspondingly combined, as will be explained on the basis of FIGS. 4A, 4B, and 4C.

The user selects the control element B1 on the user interface B of the relevant electronic control unit 100, 100' with the title "New Recording" or "Next Recording" $A_n$. Since a recording $A_1$ is already present in time slice $Z_1$, a "Next Recording" $A_2$ in the time slice $Z_1$ is automatically offered to the user in the control area of the control element B1. The user now proceeds as already described in the configuration step "Create multiple recordings $A_n$ (n>1)."

In so doing, the user can again select one of the pressure cushions $RE_5$ or $RE_6$ or both pressure cushions $RE_5$ and $RE_6$ so that two recordings $A_1$ and $A_2$ are present for one of the pressure cushions $RE_5$ or $RE_6$ or both pressure cushions $RE_5$ and $RE_6$, as explained below.

However, the user can also select other pressure cushions $SE_n$, $RE_n$, so that a complete massage configuration has taken place within the first time slice $Z_1$.

After the stop operating action at the control element B1, the time periods $\Delta T_n$ of the timekeeping component $T_n$ that have elapsed between $t_0$ and $t_1$ are associated with each of the recordings $A_n$ by the application program, so it is now possible to determine which time period $\Delta T_n$ is present as the maximum time period $\Delta T_{nmax}$ when all recordings $A_n$ are taken into account, wherein the maximum time period $\Delta T_{nmax}$ detected in the timekeeping component $T_n$ (see FIGS. 4A, 4B, 4C) is defined as the time period for the first time slice $Z_1$. In other words, the first time slice $Z_1$ always has a time period that represents the maximum time period $\Delta T_{nmax}$ of at least one of the recordings $A_n$ performed during the first time slice $Z_1$.

Configuration Step (Optional)—"Select at Least One Additional Time Slice $Z_n$ (n>1)":

To configure another, next time slice $Z_n$ (n>1), the user selects the control element B2 with the title "Next Time Slice" $Z_n$ (n=number of time slices) on the user interface B of the relevant electronic control unit 100, 100'.

If a time slice $Z_1$ is already defined, the user is automatically offered a "New Time Slice," the time slice $Z_2$, in the control area of the control element B1.

In a next time slice $Z_2$, it is possible to proceed according to the configuration step "Create at least one recording $A_n$ (n=1)" or the configuration step "Create multiple recordings $A_n$ (n>1)."

The massage configuration can thus include multiple time slices $Z_n$, which are configured according to the above-described configuration steps "Create at least one recording $A_n$ (n=1)" or "Create multiple recordings $A_n$ (n>1)," wherein it is possible according to the invention to change the sequence of the time slices $Z_n$ and/or to leave out already-configured time slices $Z_n$ and/or to repeat already-configured time slices $Z_n$ by means of the application program within the electronic control unit 100, 100'.

Figure 3B:
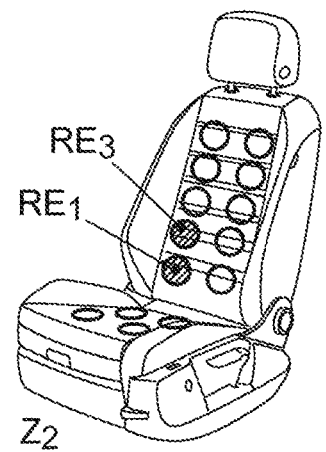
FIG. 3B shows the vehicle seat with two elements in the backrest portion of the vehicle seat, wherein the pressure is less than the maximum pressure shown in the pressurized elements in FIG. 3A.
Figure 3C:
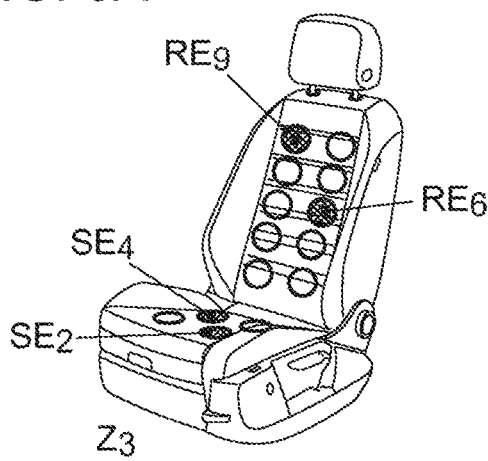
FIG. 3C shows the vehicle seat with two elements in the backrest portion of the vehicle seat that are pressurized with the maximum pressure and two elements in a seat portion of the vehicle seat that are pressurized with a maximum pressure.
Figure 3D:
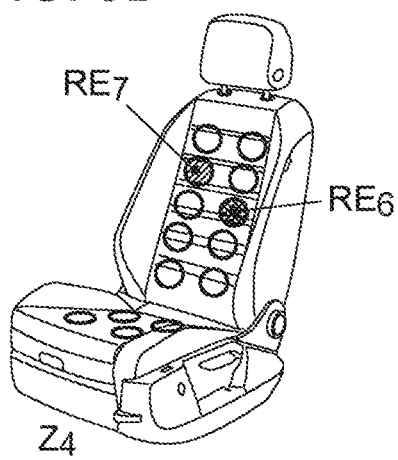
FIG. 3D shows the vehicle seat with two pressurized elements in the backrest portion of the vehicle seat, wherein one element is pressurized with the maximum pressure and the second element is pressurized with a lower pressure.

To illustrate the invention, additional time slices $Z_n$ are explained by way of example on the basis of FIGS. 3B to 3D.

A Second Time Slice $Z_2$:

According to the step "Select at least one additional time slice $Z_n$ (n>1)," for example in order to additionally configure another, next time slice $Z_2$ (n>1) that is different from the first time slice $Z_1$, the user has selected the control element B2 with the title "Next Time Slice" $Z_n$ (n=the number of time slices) on the user interface B of the relevant electronic control unit 100, 100' for further configuration.

As shown in FIG. 3B, in accordance with "Create at least one recording $A_n$ (n=1)" the user actuates a region in the center between two pressure cushions $RE_1$, $RE_3$ in the backrest area of the backrest portion 14 in the sense of a pressure actuation, so that the pressure cushions $RE_1$ and $RE_3$ are pressurized uniformly or non-uniformly by an operating action, as is symbolized by diagonal hatching in contrast to the crosshatching in FIG. 3A.

At the start of the operating action on the vehicle seat 10, the control element B1 at the relevant electronic control unit 100, 100' is once again actuated in the next time slice $Z_2$ for a user entry with the title "New Recording" if this is the first recording, causing a pressure pattern $p_1/t_1$ and a pressure pattern $p_3/t_3$ for the pressure cushions $RE_1$ and $RE_3$ to be recorded in a recording $A_1$ within the second time slice $Z_2$.

In this exemplary embodiment, the diagonal hatching means that the pressure actuation at the two pressure cushions $RE_1$ and $RE_3$ has taken place such that, for example within the time $t_1$ and $t_3$, the two pressure cushions $RE_1$ and $RE_3$ have been pressurized to 50% with a pressure distributed 50%/50% between the pressure cushions. It is a matter of course that the step "Create multiple recordings $A_n$ (n>1)," which permits additional recordings $A_n$ in the second time slice $Z_2$, can once again follow in the second time slice $Z_2$.

A Third Time Slice $Z_3$:

According to the step "Select at least one additional time slice $Z_n$ (n>1)," for example in order to additionally configure another, next time slice $Z_3$ (n>1) that is different from the other time slices $Z_n$, the user has selected the control element B2 with the title "Next Time Slice" $Z_n$ (n=the number of time slices) on the user interface B of the electronic control unit 100, 100' for further configuration.

As shown in FIG. 3C, in accordance with the step "Create at least one recording $A_n$ (n=1)" the user actuates an arbitrary pattern of pressure cushions $SE_2$, $SE_4$ in the seat portion 12 and $RE_6$, $RE_9$ in the backrest portion 14 in the sense of a pressure actuation.

At the start of the operating action on the vehicle seat 10, the control element B1 at the relevant electronic control unit 100, 100' is actuated for a user entry with the title "New Recording" if this is the first recording, causing the pressure patterns $p_2/t_2$ and $p_4/t_4$ for the pressure cushions $SE_n$ in the seat portion 12 and the pressure patterns $p_6/t_6$ and $p_9/t_9$ for the pressure cushions $RE_n$ in the backrest portion 14 to be recorded in a recording $A_1$ within the third time slice $Z_3$.

In this exemplary embodiment, the crosshatching means, analogously, that the pressure actuation at the pressure cushions $SE_2$, $SE_4$ in the seat portion 12 and $RE_6$, $RE_9$ in the backrest portion 14 has taken place such that the pressure cushions $SE_2$, $SE_4$, $RE_6$, $RE_9$ have been pressurized to 100% with a maximum pressure $p_{2max}$, $p_{4max}$, $p_{6max}$, $p_{9max}$ within the times $t_2$, $t_4$, $t_6$, $t_9$. It is a matter of course that the configuration step "Create multiple recordings $A_n$ (n>1)," which permits additional recordings $A_n$ in the third time slice $Z_3$, can once again follow in the third time slice $Z_3$.

The user's operating action of four pressure cushions $SE_2$, $SE_4$, $RE_6$, $RE_9$ simultaneously is not readily possible, which will be discussed later. In this respect, the above example illustrates a method of configuration according to the invention that includes that the pressure cushions $SE_2$, $SE_4$, $RE_6$, $RE_9$ can be actuated simultaneously or not simultaneously within a time slice $Z_3$ within a recording $A_n$. In other words, the pressure cushions $SE_2$, $SE_4$, $RE_6$, $RE_9$ can be pressed in parallel, with overlap, or sequentially, wherein the pressure on the pressure cushions $SE_2$, $SE_4$, $RE_6$, $RE_9$ can likewise vary in a recording $A_n$ or from recording $A_1$ to recording $A_2$ and so on.

A fourth time slice $Z_4$:

According to the step "Select at least one additional time slice $Z_n$ (n>1)," for example in order to additionally configure another, next time slice $Z_4$ (n>1) that is different from the other time slices $Z_n$, the user has selected the control element B2 with the title "Next Time Slice" $Z_n$ (n=the number of time slices) on the user interface B of the relevant electronic control unit 100, 100' for further configuration.

As shown in FIG. 3D, in accordance with the configuration step "Create at least one recording $A_n$ (n=1)" the user actuates two pressure cushions $RE_5$, $RE_7$ in the backrest portion 14 in the sense of a pressure actuation.

At the start of the operating action on the vehicle seat 10, the control element B1 at the relevant electronic control unit 100, 100' is actuated for a user entry with the title "New Recording" if this is the first recording, causing the pressure patterns $p_5/t_5$ and $p_7/t_7$ for the pressure cushions $RE_n$ in the backrest portion 14 to be recorded in a recording $A_1$ within the fourth time slice $Z_4$.

In this exemplary embodiment, the crosshatching and the diagonal hatching mean that the pressure actuation at the pressure cushions $RE_5$, $RE_7$ in the backrest portion 14 has taken place such that the pressure cushions $RE_5$, $RE_7$ have been pressurized to 100% at the pressure cushion and to 50% at the pressure cushion $RE_5$ within the times $t_5$, $t_7$. It is a matter of course that the configuration step "Create multiple recordings $A_n$ (n>1)," which permits additional recordings $A_n$ within the time slice $Z_4$, can once again follow in the fourth time slice $Z_4$.

With regard to the operating action on the vehicle seat 10:

Various operating actions in the configuration steps directly at the vehicle seat 10 have been explained above, wherein it was made clear that the pressure cushions $SE_n$, $RE_n$ can be pressed in parallel, with overlap, or sequentially.

Provision is made according to the invention that the user presses his finger or palm on the surface of the seat portion 12 and/or the surface of the backrest portion 14, with the user activating, in particular pressing, the points or areas that he wants for his massage program. In this process, the actuation takes place unconsciously either point-by-point or near exactly one pressure cushion $SE_n$, $RE_n$ or, as explained, point-by-point or near multiple pressure cushions $SE_n$, $RE_n$ at the same time.

In this regard, it is not ruled out by the invention that the operating action takes place with multiple fingers and/or palms so that, for example, two or more pressure cushions $SE_n$, $RE_n$ can be pressed (configured) at the same time or in succession, or areas of two or more pressure cushions $SE_n$, $RE_n$ can be pressed (configured) at the same time or in succession. In other words, it is possible to press point-by-point or area-by-area near different, non-contiguous pressure cushions $SE_n$, $RE_n$ with different pressure and/or different time periods $\Delta T_n$ using one hand and using the other hand.

The application program according to the invention is programmed such that recommendations are output to the user during a recording $A_n$ within a time slice $Z_n$ so that the actuators of the pressure cushions $SE_n$, $RE_n$ are not overloaded. In other words, it is ensured (it is ensured independently of the recommendations) that the operating actions within the configuration steps can also be managed by the system within the configured massage program.

With regard to visualization on the electronic control unit 100, 100':

Provision is made according to the invention that the configured pressure patterns $p_n/t_n$ of the pressure cushions $SE_n$, $RE_n$ for each recording $A_n$ in the time slices $Z_n$ can be visualized in that the pressure of the individual pressure cushions $SE_n$, $RE_n$ is represented on the display of the control area B by a color pattern at the pressure cushions $SE_n$, $RE_n$.

Figure 4A:
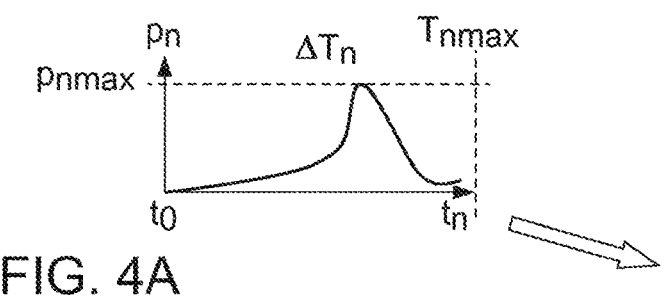
FIG. 4A shows a characteristic curve of a pressure pattern of a pressurizable element in a first recording.
Figure 4B:
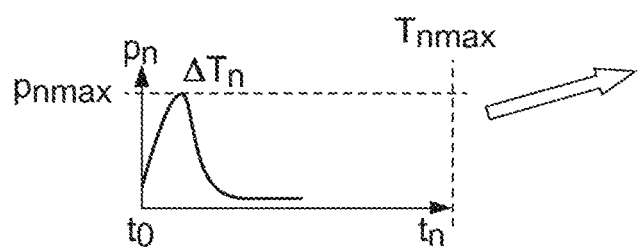
FIG. 4B shows a characteristic curve of a pressure pattern of the same pressurizable element from FIG. 4A in a second recording.
Figure 4C:
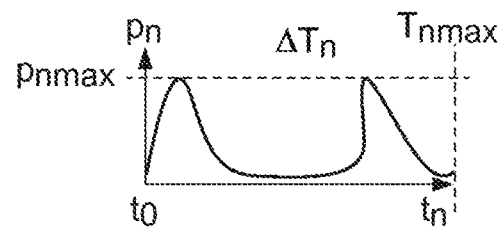
FIG. 4C shows a characteristic curve of a pressure pattern of the pressurizable element consolidated from the pressure patterns from FIG. 4A and FIG. 4B in the first and second recordings.

In an auxiliary function, the pressure patterns $p_n/t_n$ of the pressure cushions $SE_n$, $RE_n$ for each recording $A_n$ in the time slices $Z_n$ can also be visualized as characteristic curves where appropriate, as is shown in FIGS. 4A to 4C, for example, and explained below.

The visualization of the characteristic curves and the determination of a pressure pattern of a pressure cushion $SE_n$, $RE_n$ actuated multiple times in multiple recordings $A_n$ (n>1) within a time slice $Z_n$:

An example on the basis of the pressure cushion $RE_7$ from FIG. 3D:

In accordance with FIG. 3D, the user actuates a pressure cushion $RE_7$ in the backrest portion 14 in the sense of a pressure actuation in two sequential or non-sequential recordings $A_n$ (n>1) according to the step "Create multiple recordings $A_n$ (n>1)."

In a first recording $A_1$ within the fourth time slice $Z_4$, the pressure in pressure cushion $RE_7$ is slowly increased over the time from $t_0$ to $t_{7max}$, as is shown in the pressure pattern characteristic curve 1 in FIG. 4A.

The pressure peak, for example ×100% ($p_{7max}$), occurs at a later point in time as compared to the pressure pattern 2 in FIG. 4B.

In a second recording $A_2$ within the fourth time slice $Z_4$, the pressure in pressure cushion $RE_7$ is rapidly increased over the time from $t_0$ to $t_7 < t_{7max}$, as is shown in the pressure pattern characteristic curve 2 in FIG. 4B.

The pressure peak 100% ($p_{7max}$) occurs at an earlier point in time as compared to the pressure pattern 2 in FIG. 4B.

In this case, the pressure peaks can have different magnitudes, in contrast to the exemplary embodiment.

Moreover, it is evident that the time periods $\Delta T_7$ of the recordings $A_1$ and $A_2$ have different lengths.

In accordance with FIG. 4C, the characteristic curves from FIGS. 4A and 4B are superimposed and the highest respective pressures $p_{7max}$, $t_{7max}$ (FIG. 4A) and $p_{7max}$, $t_7$ (FIG. 4B) at each point in time are combined into an overall characteristic curve.

The overall pressure is thus obtained from the relevant "recorded" measured maximum individual pressures $p_{nmax}$, $t_0$ along the time axis $t_n$, by means of which an overall characteristic curve, and thus a pressure profile for the pressure cushion $RE_Q$ within the time slice $Z_n$, is created according to FIG. 4C.

In this process, the length of the pressure pattern thus consolidated is assigned the maximum time period $t_{nmax}$ of a recording $A_n$ that has been configured or detected in the exemplary embodiment as $\Delta T_{7max}$ in the pressure pattern 1 of the first recording $A_1$ within the fourth time slice $Z_4$.

Optionally, provision can be made that a selection is made on the user interface B of the relevant electronic control unit 100, 100' as to whether the entire region and thus the entire surface of the seat portion 12 and/or the entire surface of the backrest portion 14 can be configured.

It is possible that the user in this context is already sitting on the vehicle seat 10, so that the entire surface of the seat portion 12 is already pressed, so a configuration is present that is not recognized or not possible. For this case, the configuration of the seat portion 12 for massage purposes can be excluded via the user interface B of the relevant electronic control unit 100, 100', or it is automatically detected using the occupant-presence detection that the user is already sitting on the vehicle seat 10, so that the configuration of the seat portion 12 is automatically excluded and only configuration of the backrest portion 14 is allowed.

In a preferred embodiment of the invention, the vehicle seat 10 and the relevant electronic control unit 100, 100' are equipped to perform the method for configuring the massage program. To this end, the vehicle, in particular the vehicle seat 10, includes a controller, and the mobile and/or permanently installed electronic control unit 100, 100' is connected with the vehicle-side controller for mutual data exchange, wherein computer-readable program algorithms in the electronic control unit 100, 100' and the controller communicate with one another in such a manner that the method can be executed, wherein necessary characteristic maps are stored in the program algorithms if applicable.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for initializing a massage program of a massage device of a vehicle seat of a vehicle via an electronic control unit that communicates indirectly or directly with at least one controller of the vehicle seat of the vehicle, the method comprising:
    controlling at least one pressurizable element of the vehicle seat via the electronic control unit through the at least one controller of the vehicle seat during a configuration of the massage program;
    controlling the at least one pressurizable element of the vehicle seat directly via an actuator during the configuration of the massage program;
    outputting the massage program via the controller of the vehicle seat, after the start of the massage program, the massage program controlling individual pressurizable elements in the vehicle seat in accordance with the configuration;
    performing, during the configuration of the massage program, at least one first configuration step via the electronic control unit and recording a corresponding first pressure controlled by the electronic control unit as a first part of the configuration; and
    performing at least one second configuration step via the actuator directly at a seat portion and/or at a backrest portion of the vehicle seat and recording a corresponding second pressure controlled directly via the actuator as a second part of the configuration.

2. The method according to claim 1, wherein the at least one first configuration step is performed on a mobile electronic control unit and/or on a control unit that is permanently located in the vehicle.

3. The method according to claim 1, wherein the massage program is created in a mobile electronic control unit via an application program and is transmitted wirelessly or over wires through an access point to a transmitting and receiving unit of the vehicle, and wherein signals of the transmitting and receiving unit of the vehicle is routed through a vehicle-internal communication line to the controller of the vehicle seat of the vehicle, which outputs commands for controlling individual pressurizable elements of the at least one pressurized element in the vehicle seat after the start of the massage program.

4. The method according to claim 1, wherein the massage program is created in the electronic control unit that is permanently located in the vehicle via an application program and is transmitted wirelessly or over wires through a vehicle-internal communication line to the controller of the vehicle seat of the vehicle, which outputs commands for controlling individual pressurizable elements of the at least one pressurized element in the vehicle seat after the start of the massage program.

5. The method according to claim 1, wherein the at least one first configuration step by the electronic control unit includes an initial operating action at a user interface of the electronic control unit in which at least one time slice is defined,
    wherein, after the initial operating action and within the at least one time slice, at least one recording of at least one pressurizable element of the vehicle seat is started by another operating action at the user interface of the electronic control unit after a start of the at least one recording,
    wherein, after the at least one first configuration step and within the at least one time slice, the at least one second configuration step is performed directly at the seat portion and/or backrest portion by a further operating action being performed directly on at least one first pressurizable element of pressurizable elements of the at least one pressurizable element in which the at least one pressurizable element is pressurized, and
    wherein a specifiable pressure resulting from the further operating action for a time period depends on the duration of the further operating action.

6. The method according to claim 5, wherein multiple recordings of the at least one pressurizable element are recorded in a time slice.

7. The method according to claim 6, wherein at least one or multiple recordings is/are recorded individually or simultaneously of one or more pressurizable elements in a time slice.

8. The method according to claim 5, wherein multiple time slices are recorded, wherein one or more time slices with one or more recordings apiece are executed consecutively after the massage program is started following completion of the configuration,
    wherein the time slices are configured in the configuration or available as a selectable adaptable sequence, or a combination thereof.

9. The method according to claim 5, wherein the recording within a particular time slice of the at least one time slice that has a maximum time period detected in a timekeeping component of the electronic control unit is defined and output within the massage program as a duration of the particular time slice.

10. The method according to claim 1, wherein $p_n/t_n$ characteristic curves that have been recorded in separate recordings of one and the same pressurized element in a time slice are superimposed after their recording, where $p_n$ identifies pressure for an n pressurized element and $t_n$ identifies the time slice for the n pressurized element being pressurized,
    wherein the recording within a particular time slice of at least one time slice with a maximum time period in a timekeeping component of the electronic control unit determines a maximum duration of the separate recordings, and
    wherein maximum measured pressures in the separate recordings are combined into a common overall $p_n/t_n$ characteristic curve of a pressure pattern at each point in time in the maximum time period.

11. The method according to claim 1, wherein the corresponding second pressure (p) is recorded over time (t) forming a pressure curve (p/t) for the at least one pressurizable element, the pressure curve forming the second part of the configuration of the massage program.

12. The method according to claim 1, wherein the controlling of the at least one pressurizable element directly via the actuator is recorded by at least one pressure sensor as the second part of the configuration for the massage program.

13. A configuration system for configuring a massage program of a massage device of a vehicle seat of a vehicle, the configuration system comprising:
- at least one electronic control unit that is connected directly or indirectly to at least one controller of the vehicle seat of the vehicle;
- at least one pressurizable element in the vehicle seat, the at least one pressurizable element being connected to the controller of the vehicle seat of the vehicle and being controlled through the at least one electronic control unit;
- at least one actuator associated with the at least one pressurizable element of the vehicle seat, the at least one actuator being connected to the at least one controller of the vehicle seat of the vehicle and the at least one actuator filling or emptying the at least one pressurizable element with a fluid medium, the at least one actuator configured for directly controlling the at least one pressurizable element of the vehicle seat during the configuration of the massage program; and
- at least one pressure sensor associated with the at least one pressurizable element, the at least one pressure sensor being connected to the at least one controller of the vehicle seat of the vehicle and sensing a pressure over time (p/t) in the at least one pressurizable element in order to sense pressure patterns to form a configuration of the massage program.

14. The configuration system of claim 13, wherein the at least one electronic control unit records the pressure patterns from the filling and emptying of the at least one pressurizable element by the at least one actuator and stores the pressure patterns as the configuration for the massage program, the filling and emptying being detected by the at least one pressure sensor.

* * * * *